(12) United States Patent
Mateau et al.

(10) Patent No.: US 7,117,055 B2
(45) Date of Patent: Oct. 3, 2006

(54) PROCESS AND SYSTEM FOR DESIGNING MOLDS AND DIES

(75) Inventors: John Mateau, Windsor (CA); Alan Baljeu, Windsor (CA)

(73) Assignee: Cornerstone Technology, Inc., Windsor (CA)

( * ) Notice: Subject to any disclaimer, the term of this patent is extended or adjusted under 35 U.S.C. 154(b) by 0 days.

(21) Appl. No.: 10/461,039

(22) Filed: Jun. 13, 2003

(65) Prior Publication Data

US 2004/0064211 A1   Apr. 1, 2004

Related U.S. Application Data

(60) Provisional application No. 60/388,914, filed on Jun. 14, 2002.

(51) Int. Cl.
*G06F 19/00* (2006.01)

(52) U.S. Cl. ............... 700/98; 700/95; 700/56; 700/114; 76/4

(58) Field of Classification Search .......... 700/95, 700/98, 56, 114; 76/4
See application file for complete search history.

(56) References Cited

U.S. PATENT DOCUMENTS

| | | | | |
|---|---|---|---|---|
| 4,937,768 A | * | 6/1990 | Carver et al. | 703/1 |
| 5,033,014 A | * | 7/1991 | Carver et al. | 703/1 |
| 5,109,337 A | * | 4/1992 | Ferriter et al. | 705/29 |
| 5,189,626 A | * | 2/1993 | Colburn | 700/182 |
| 5,680,317 A | | 10/1997 | Watanabe | |
| 5,731,982 A | * | 3/1998 | Namba et al. | 700/182 |
| 5,846,464 A | * | 12/1998 | Hoffman | 264/219 |
| 5,895,465 A | * | 4/1999 | Guha | 707/4 |
| 5,923,573 A | * | 7/1999 | Hatanaka | 703/2 |
| 6,096,088 A | | 8/2000 | Yu et al. | |
| 6,230,382 B1 | * | 5/2001 | Cunningham et al. | 29/407.1 |

* cited by examiner

*Primary Examiner*—Leo Picard
*Assistant Examiner*—Michael D. Masinick
(74) *Attorney, Agent, or Firm*—Carlson, Gaskey & Olds

(57) ABSTRACT

A system and method for designing a tooling assembly automatically validates and maintains relationships between components in view of predefined requirements, preferences, and best design practices. The process is performed as part of a program performed by a computer system. A database containing information relevant to the design of the tooling assembly such as design standards, customer requirements and other desired attributes of the completed tooling assembly is used to define a set of requirements for each component. The specific part configuration for each component is then stored in a Master Control File for validation with respect to other components within the tooling assembly to maintain interrelationships between each component within the tooling assembly.

26 Claims, 3 Drawing Sheets

PROCESS AND SYSTEM FOR DESIGNING MOLDS AND DIES

This application claims priority to U.S. provisional patent application Ser. No. 60/388,914 filed on Jun. 14, 2002.

BACKGROUND OF THE INVENTION

This invention relates to a process and system for designing a tooling assembly such as a mold or die, and specifically to a tooling assembly design process and system accommodating and validating interrelationships between components.

Molds and dies are complex mechanisms for forming uniquely shaped parts in a plastic molding, die casting or metal stamping process. Each mold or die is unique to the specific part fabricated and therefore requires a unique design. A conventional design begins with the desired shape of the finished part and proceeds with the design of a cavity to properly form the part. The design progresses by designing runner systems to carry material to the mold cavity, cooling systems to control cooling of the part after injection of molten material in addition to support, opening and part ejection mechanisms including any inserts, or retractable coring required for a specific part.

Typically, this entire process is performed by a designer working with computer-aided design and manufacturing software. Conventional mold design software and methods include the use of predefined components and/or databases to create components and then provide tools for manipulating those components. Such software creates a tooling assembly design with predefined parts combined by the designer working at a computer workstation. The use of predefined parts does not account for interrelationship between parts of the mold. As appreciated, each part in the mold is related to every other part in the mold and therefore those interrelationships must be recognized and accommodated. Molds are complex mechanisms and comparing and managing relationships among parts increases design time, cost and the risk of error.

Accordingly, it is desirable to develop a process of designing a tooling assembly that validates interrelationships among each part of the mold and provides a complete and accurate design in view of those interrelationships.

SUMMARY OF THE INVENTION

The present invention is a system and method for designing a tooling assembly that automatically validates and maintains relationships among components in view of predefined requirements, preferences, and best practices.

The process is performed by a computer system including a database residing within a memory device containing information relevant to the design of the tooling assembly. The database contains design standards, customer requirements and other desired attributes of the completed tooling assembly. A Master Control File stores the initial requirements for a specific tooling assembly design. The process is executed by first determining requirements for each component in view of information contained within various databases and then determining a specific configuration for each component relative to the requirements. The specific part configuration for each component is then stored in the Master Control File. Each component configuration is validated to maintain proper interrelationships between each component within the tooling assembly.

Accordingly, the system and process of this invention designs a tooling assembly and validates interrelationships between each part of the tooling assembly to provide a complete operable design.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

An embodiment of this invention is a process and system of designing a tooling assembly such as a plastic injection mold or die where each part is designed in accordance with predetermined criteria and in consideration of interrelationships with other components within the tooling assembly.

This disclosure details as an example the process steps used to design a plastic injection mold. It should be understood that although the specific example of the design of a plastic injection mold is discussed, it is within the contemplation of this invention to apply this process to the design of molds, dies and other complex tooling assemblies.

Figure 1:
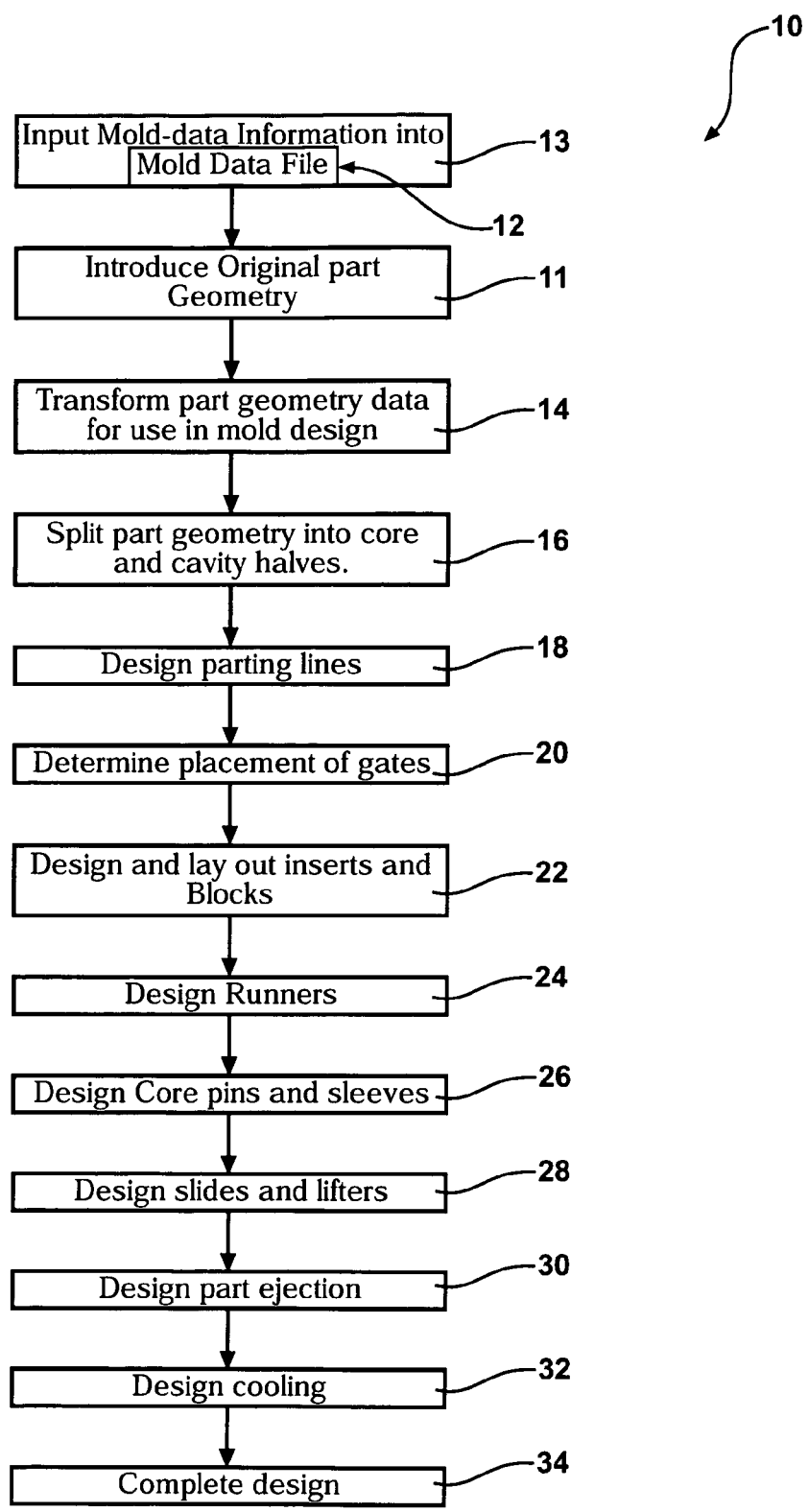
FIG. 1 is a block diagram of steps involved in designing a tooling assembly.

The process of designing a mold utilizing part geometry data according to a data file according to interrelationships between all parts of the mold is schematically shown at 10 in FIG. 1. This includes the initial step of inputting mold specification data into a Mold Data File 12 indicated at 13. Mold specification data is transformed into the Mold Data File 12. The Mold Data File 12 includes application specific requirements for the mold. Such application specific requirements include mold specifications, such as material, mold machine specifications and limitations. Mold machine specifications and limitations include such limitations as maximum and minimum press forces and limitations on overall size and weight. Other specifications specific to the current tooling assembly being designed may be directly input into the Mold Data File 12 to provide an additional set of requirements for the design.

Further, the Mold Data File 12 also includes any customer specifications required for each mold. The contents of the mold data sheet and consequently the Mold Data File 12 includes any data applicable to the specific mold along with general standard features required of each mold designed for a particular customer. Such information can relate specifically to mold parameters or other factors such as lifting device capacity or other physical limitations.

Part geometry as received is in a form conducive to design of the part itself, and not necessarily favorable for design of the mold. Original part geometry information is introduced into the system as indicated at 11. The part geometry is then imported into a computer-aided design (CAD) system contained as part of the mold design system. This step is indicated at 14 in FIG. 1. Further, this step includes the process of transforming the part geometry in preparation for mold design. Transformation of part geometry includes the steps of reorienting and scaling the part to fit the base unit standard and scale of the mold and adding a shrinkage factor. The shrinkage factor is determined by material characteristics and is part of information contained within the Mold Data File 12.

The steps taken to reorient the part are recorded and stored for latter use in the event that changes are made to the configuration of the part. In the event dimensional changes to the part are required, a designer does not need to redo orientation work completed on an earlier version of the mold. Instead, the recorded reorientation steps are re-played to recreate the mold. Further, the Mold Data File 12 may include transformation data allowing the transformation process 14 to be automated such that each design iteration does not require a renewed transformation of part geometry.

The design process continues by splitting the part geometry into core and cavity halves (indicated at 16). During this step, undercuts in the part are identified and separated from the core and cavity. This step in the process is tedious for a designer to perform, however this process is automated by using surface analysis to determined which half of the mold each section of the part surface belongs. Surfaces of the part are formed by either the core or cavity halves of the mold. Many part specific considerations determine whether a given surface should by the core or the cavity half of the mold.

Subsequent to splitting part geometry into core and cavity is the design of mold locks, parting lines and shut-off as indicated at 18. The mold parting line shuts off seals plastic within the mold while mold parting line locks must counteract vector mechanical forces, internal molding pressures, and external machine forces so that specific part geometry will not be deformed at any point during the process. Designing parting lines as indicated at 18 is a complex task requiring advanced surface creation techniques and assists in maintaining part specific dimensional tolerances. The parting lines are designed to eliminate the leaking of plastic during the molding process. The designing of parting lines takes into account molding pressures, type of material, machine capacity and limitations along the entire length of the parting line itself. The design of the mold parting line has a direct impact on many interrelated parts within the mold. The process of this invention takes into account these interrelations in the design of each specific feature of the mold.

Upon completion of the design of the parting lines, locations of the various gates within the mold are determined as indicated at 20. The positions of gates on the mold are determined according to part geometry, material specifications and molding machine specifications. Along with the placement and sizing of the gates, vents are created within the cavity to release air from the mold cavity as plastic enters into the mold cavity. The specific design of the gates and vents include many different possible solutions, each having specific advantages and disadvantages.

Specific sizes of gates are determined according to specific part requirements including overall size, material type and overall surface area. Further, the specific designs of the gates are also dependent on the specific machine limitations. The machine specifications will include a maximum injection speed along with a maximum and minimum material injection rate that greatly affects gating configurations. Vent sizes and positions within the mold or die are also affected by interrelationships between the molding machine and the specific part configuration.

Once gate locations are determined for the mold, the design and layout of inserts or blocks is determined as indicated at 22. A block is a part of the mold forming the cavity side or core side and shaped according to specific part geometry. An insert is a removable portion of the cavity or core parts of the mold that together form the entire part geometry. The specific shape of the part is formed either by geometry formed by shapes within the main blocks of the mold halves or by inserts that are attached to the interior of the block. Molds for smaller parts are often designed so that the parts can be formed within inserts to simplify machining and fabrication. Often many parts are made in the same mold blending the use of inserts and shapes formed within the mold block. Smaller parts are made in multiples within a single mold making the use of inserts advantageous. When such inserts are used, parting lines are developed with respect to the inserts and the parts need to be arranged within the mold in support of the inserts. The specific molding blocks are then completed around the inserts along with any supporting mechanisms within the mold.

Some part features are more advantageously formed by cutting directly into the main blocks without the use of inserts. Cutting into the main blocks can be more expensive because of the machining required, however, some part features are suitable to machining directly into the main block. The decisions whether to use cavity, core or other insert to form the specific part is usually made by the customer in specifications which are put into the Mold Data File 12.

The size of any insert will be dependent on other factors arising from the overall mold configuration. In addition to the use of blocks or inserts to form a cavity, the overall size of the blocks is constrained by several factors, not all of which are necessarily specifically called out within the Mold Data File 12. Such factors include molding machine capacity, the inclusion of mechanisms and components to complete the mold (e.g., injection mechanisms and coring mechanisms) along with the cost driven desire to minimize the overall weight.

With the size of the mold block and quantity of inserts determined, the runners are designed for each mold block to transport molten material from the sprue to the gates in each cavity. Runners are designed to distribute molten material evenly throughout the cavity during the molding process. Accordingly, it is desirable that the runners are balanced to provide even flow to all of the parts or sections thereof. It is desirable to make the runners as efficient as possible because plastic or molten materials within a runner hardens and becomes waste once the part is removed from the mold. Other factors affecting the design of runners are runner placement and size along with the number of runners routed according to part placement within the mold. In addition, molding machine capacities along with the material used to fabricate the part are factors considered during the design of the runner system.

With the runners designed for the mold as indicated at 24, core pins and sleeves are then designed. The design of core pins and sleeves (as indicated at 26) fulfill many different requirements specific to each part. Holes in the part are formed by various mechanisms such as core pins, inserts, ejector sleeves and solid blocks. The specific part geometry is refined to ensure the hole has sufficient draft to allow it to slip off and out of mold when it is injected. The part may not always be designed with moldable features in mind. If this occurs, a mold is designed providing the solution for a moldable part with the specific requirements and configuration needed and still provide best practices. Each method of forming holes within a part has various advantages and disadvantages when considered. Each advantage and disadvantage is considered in view of interrelating parts of the mold to provide a best design configuration.

For example, an ejector sleeve is often a preferred way of handling a vertical hole. This is because the sleeve is the most effective and space efficient means for ejecting the part off of the core pin. However, often the location of the pin will conflict with other parts of the mold mechanism such as a press knockout, or the length of the pin required to form a vertical hole is such that it will interfere with other mechanisms within the mold. In such instances, the advantages and disadvantages are considered along with the specific mold configuration (calculated within the process 10) to provide an optimal solution for placement and choice of mechanisms to form holes or openings within the parts.

Many parts are shaped such that undercuts are required in the completed part. Undercuts in the completed part require slides and lifters that pull away from the completed plastic part after the molten material forming the part has solidified. Without these mechanisms pulling away from the part, the completed part could not be removed from the mold. Slides and lifters forming undercuts are complex mechanical assemblies which must blend into the mold surface data according to the part specific configuration. Many of the slides and lifters are designed as standard configurations. However, the standard configuration is often modified to fit unique parting line configurations and part geometry. In order to design these mechanisms, the system must combine its knowledge of mechanism design with the standards, the Mold Data File 12 and the users' own inputs. Accounting for each of these respective specifications and recommendations provides a functional design accommodating other mechanisms and features within the mold.

The design of the slides and lifters affects every other part of the mold including block size, insert layout, cooling circuit design and injection methods. The process and system of this invention accounts for the interrelationship of every part with every other part in the mold and makes certain specific modifications according to the specific application to reach an optimal mold design solution in view of the constraints of that specific mold. Although the optimal solution maybe outside of any one specific design criterion, it is the configuration of the mold that best accommodates all of the design requirements and desires communicated in the Mold Data File 12 and the specific part geometry.

The part is normally ejected from the mold by way of a series of ejector pins that extend from the cavity to push the molded part from the mold. During molding, the face of each ejector pin is flush with the surface of the core and forms a part of the core. Once the mold is open, the ejector pins extend pushing the completed and solidified part from the mold. The design of part ejection mechanisms, indicated at 30, balances the need of part ejection within the configuration of the mold and other assemblies such as the lifter and slide assemblies also within the mold. Ejector pins must not conflict with open mold cores or cooling circuits designed to cool the mold. Accordingly, the specific position and configuration of each ejector pin is determined and designed according to the interrelationship between it and the other mechanisms within the mold.

In addition to the ejection system, a cooling circuit must be designed, indicated at 32, within the mold to allow the molten plastic or material to be cooled evenly and quickly. The cooling system within the mold is critical to proper part fabrication. Many factors are considered in the design of a cooling circuit including part thickness in specific areas, distance from the gating and runner systems along with the temperature of the molten material in the region where a specific cooling circuit is located.

Further, the overall desired cycle time for fabrication of the part is often considered in the configuration and construction of the cooling circuit within the mold. There are several approaches to designing the cooling circuits. The specific approach to the design of the cooling circuit is based on the shape of the part. The distance requirements of the cooling from the part surfaces, the diameter of the cooling lines along with a computerized cooling analysis to determine the solidification time and temperatures within the cooling part.

Once the cooling has been designed, the rest of the mold is designed as indicated at 34. The rest of the mold includes support structures outside of the mold blocks that support and move the mold between open and closed positions. Further, other mechanisms on the mold may include temperature and pressure sensing devices that provide information to the controller of multiple molding conditions such as pressure and temperature. Various guide pins are incorporated into the mold to precisely guide the two mold halves together during molding of the part. The rest of the mold configuration includes all of the supporting structure for the mold as is currently known to one skilled in the art.

Further, it should be understood that each of the steps discussed here and above for the design of the mold are not necessarily required for each mold. The specific requirements presented for each part configuration will determine the number of steps required to complete the entire mold design. In some instances, the specific order of design may be modified in order to more efficiently and optimally design the mold and reflect the level of importance as communicated by the Mold Data File 12. For example, the core pin may be of substantial importance for a specific application and therefore would take precedence over the design of the runners, such that design of the runners would be modified to accommodate the specific core pin configuration. In addition, some parts may require a specified surface finish such that the specific location of the ejector pins produces little or no surface marring. The ejector pins therefore are designed in such a way as to take priority over other features in a specific mold.

In addition to the steps of design, the design process can involve additional steps or action items. Additional items can include handling of engineering changes to the part. Often a customer will change the configuration of a part before the mold design is complete. When this happens, a series of consequences are imparted on the mold designer. First, the new part will need to be imported into the system. The transformation steps for that specific part are saved in a way that a new design of a part is not burdensome on the designer. The saved transformation steps are merely reapplied to the new version of the part to prepare the geometry of the part for mold design process. Once the new or changed part is transformed, the design process is reinstituted and changes to the mold design are accomplished as required by the new design.

The ability to handle revisions without requiring a CAD interface to revise the mold design is an advantage of this invention compared to prior art mold design processes. Once saved, the part transformations can be (at the option of the user) applied to mold geometry immediately causing all components to re-adjust and be reconfigured, on to the other, thereby decreasing design time and improving the overall design of the mold.

Another step that is often required for mold designs is the verification of the design. Every part of the design needs to be reviewed and approved by a supervisor or by the customer. This system aids in this process by forming an analysis as the mold is being designed through each of the steps to ensure that all the requirements are met and are instituted as are contained in the Mold Data File 12. Further, this process of this invention checks to ensure that no mechanisms or configurations of the mold interfere with one another and that every undercut and slide mechanism functions properly.

Figure 2:
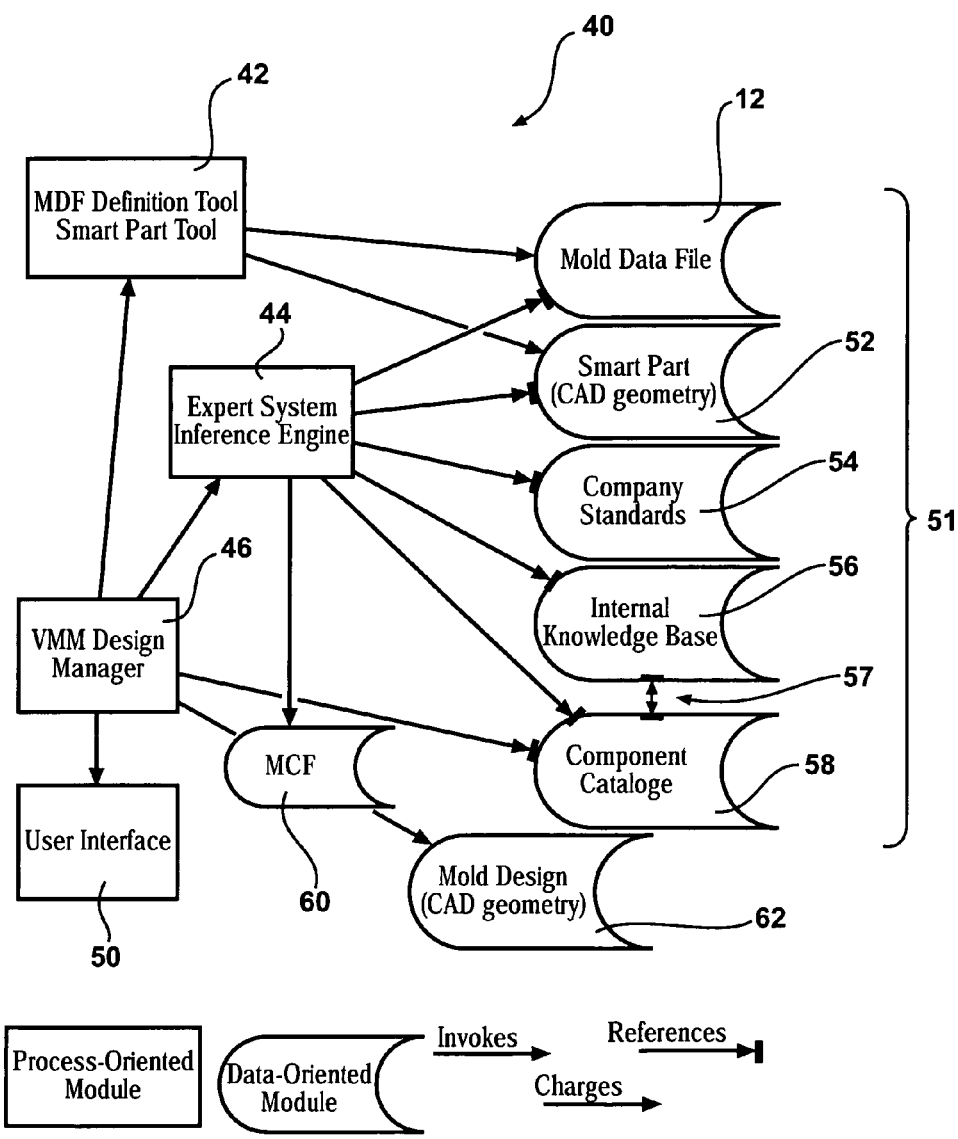
FIG. 2 is a block diagram illustrating interrelationships between data and process elements of the system for designing a tooling assembly.

Referring to FIG. 2, the process is accomplished by a system schematically shown at 40 that includes a design manager 46 communicating with an expert system inference engine 44, a mold design file definition tool 42 and a user interface. The design system 40 includes many modules generally indicated at 51. The inference engine 44 is designed to answer queries from the design manager 46. The inference engine 44 gathers information contained within the various modules 51.

The Mold Data File 12 includes all of the information provided as requirements for a specific mold. These requirements can include anything from machine limitations to lifting crane capacities and insert specifications. The Mold Data File 12 can also include customer design requirements for each mold.

A smart part module 52 includes information on specific features of the part to be molded within the cavity of the mold. This information is applied according to specific functions. These specifications can include material callouts, tolerance callouts, along with strength, weight, size and other restrictions specific to the function of specific sections of the molded part.

Another module indicated at 54 contains information on company specific standards. Company specific standards includes such items as overall height and weight of a mold, along with specific features desired and required by the company, such as gate placement, ejector pin size, backing plate thickness and materials used in constructing the mold. Further, company standards may also include guidelines and specific default mechanisms for ejector pin design, runner design, lifter design or how to handle the molding of openings within a part. The specific data and requirements contained within the company standards module 54 are not limited to mold specific parameters. The company standards may also include such limitations as the overall weight of the mold relative to the lifting capacity of a crane within that company's operating facilities.

Other practical limitations are also be included in the company standards, such as for example, overall height and width of the mold, placement of numerical identification markings required for each mold for identification purposes according to that specific company's designation schemes. As appreciated, any limitations, tolerances and recommendations can be included within the company standards module 54 and are limited only by the desires and requirements communicated by a company, client or end user of the mold.

Further, the system may include several different company standard modules 54 relating to the specific instructions applicable to different customer preferences and requirements, fully customizing the end mold design to a specific customer or end user.

Module 56 contains an internal knowledge base. The internal knowledge base is a series of restrictions, limitations, tolerances and guidelines that are accumulated from experience and learning. The accumulated knowledge of an experienced designer encompasses all aspects of mold design from the diameter of an ejector pin relative to part size, to specific placement of an alignment pin. These best practices are catalogued and listed within the internal knowledge database 56 and drawn upon during design of the mold. Each item and component included in a mold can also include a limitation or recommended practice contained within the internal database 56. As appreciated, best practices relating to any complex tooling assembly can also be stored and utilized to apply this method to other tooling assemblies.

The internal knowledge base 56 is developed using mold data from currently or previously built molds along with data gathered from experience in designing molds. The internal knowledge base 56 is continually updateable to assimilate additional information relevant to best practices encountered during the design process. The internal knowledge database 56 continually expands and changes in order to apply new information to subsequently designed molds. Improvements are documented and can include detailed descriptions of the accompanying circumstances requiring deviations from known best practices and are included for application to subsequently designed molds. This accumulation and continual assimilation of mold design best practices aids in the design of subsequently designed molds to improve and optimize subsequent mold designs.

A component catalog module indicated at 58 includes numerous and specific standard sized components that are commonly used in mold construction. Such catalogues are known to workers skilled in the art and can include many currently available components common to mold design. Information relevant to the use, size and requirements for each part is utilized in the design of each component within the mold. The internal knowledge base 56 references information contained within the component catalog module 58 as indicated by 57. Information is shared for use between the modules to facilitate efficient design of each component within the mold.

A Master Control File 60 contains application specific configuration information of the mold currently being designed. Information concerning the design and application of a specific mold is transferred from the Mold Data File 12 to the Master Control File 60. The Master Control File 60 contains information on all components of the mold design as specifications and configurations for each mold are defined. Information relevant to each component part, application specific parameters and any other information relevant to a specific mold design is contained within the Master Control File 60. The information contained within the Master Control File 60 is continually updated as components are added to the mold design. Configuration information in the Master Control File 60 is used to determine all of the interrelationships between all of the parts within the mold.

Information within the Master Control File 60 is interpreted and translated into a graphical output 62. The specific type of graphical output 62 can be programmed for known CAD file formats or directly output as a set of detailed drawings for the entire mold assembly and/or each component. As appreciated, the type of graphical output 62 can vary depending on a specific application. The Master Control File 60 maintains the information for each component of a completed mold design. This information is then interpreted and translated into information used to provide a desired output such as engineering drawings, or a model of the mold design.

Each of the modules is linked to the design manager 46 and the expert system 44. The expert system 44 draws information from each of the modules 51 to define rules regarding each component part of the mold. The term "rule" is synonymous with restrictions, tolerances, specifications, formulae and recommended practices. Having located the specific rules pertaining to that particular component the expert system 44 examines premises of those rules and determines what information is required to evaluate the specific rules. The information is retrieved and used to define rules for each component part and then to specify the specific configuration of the component part based on the defined rules. The expert system 44 evaluates conditions of each rule to see which can be consistently applied. It will then evaluate the consequences of these rules to determine what changes should be made to the design. If design changes are required, the design manager 46 coordinates each change within the Master Control File 60. The specific configuration of the system includes the design manager 46 in communication with the expert system 44, the component catalogue 58 and the Master Control File 60.

Figure 3:
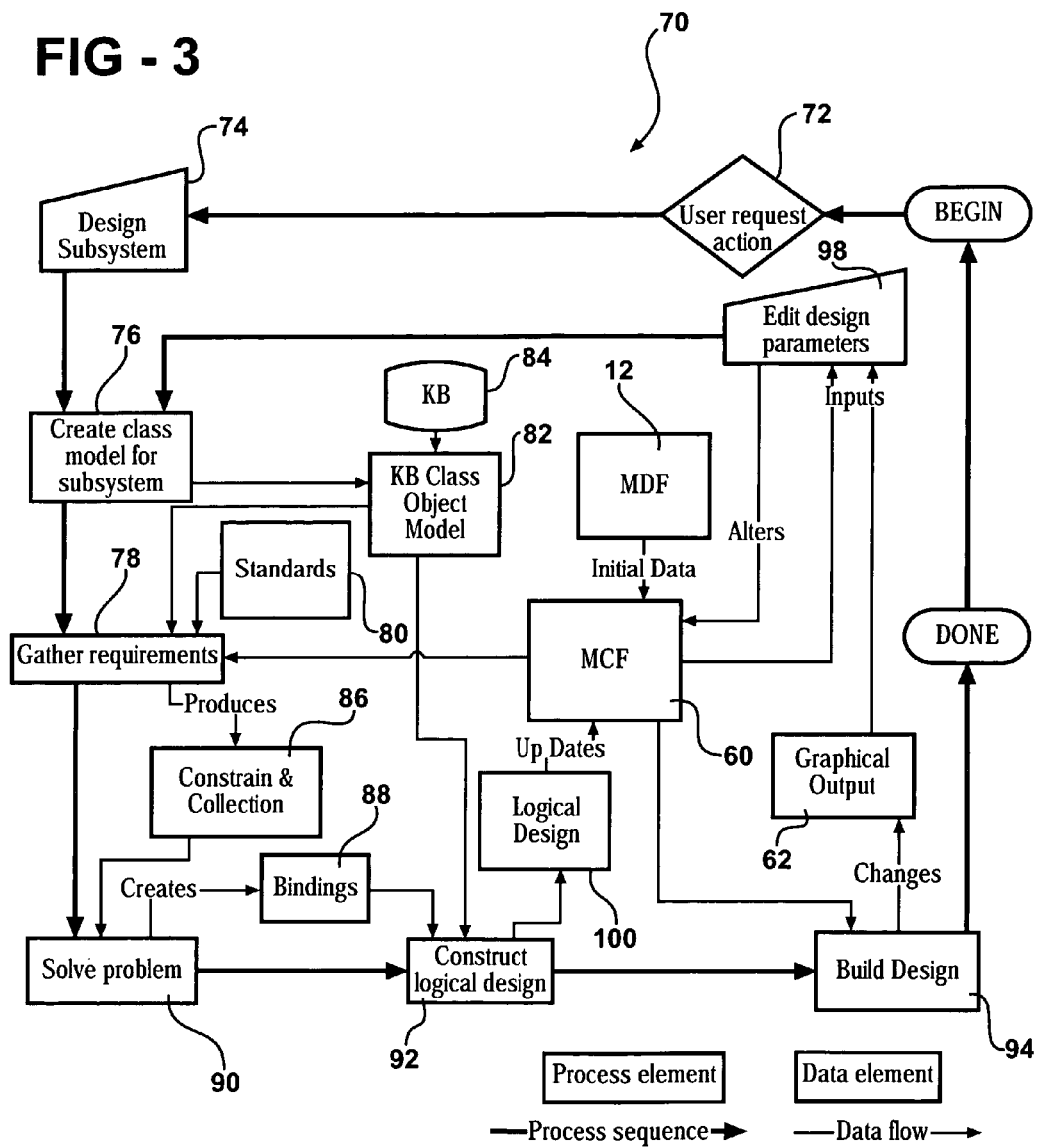
FIG. 3 is a block diagram illustrating the steps of the tooling assembly design process of this invention.

Referring to FIG. 3, the process is schematically shown at 70 and begins with an initial step of requesting an action 72. The initial step 72 consists of a request to begin a new design or to modify an existing design already stored within a Master Control File 60. The result of each complete tooling design process iteration is a set of component configurations or parameters for each component within the mold stored within the Master Control File 60. Upon initiation of a new mold design, the process proceeds by designing a subsystem of the mold or tooling assembly as indicated at 74. The design of the tooling assembly is an iterative process beginning with a first subsystem, such as for example the design of core and cavity halves, parting lines, core pins, ejector pins and sleeves. The specific order of subsystem component design proceeds according to the specific application.

A subsystem class model 76 is defined with input from a knowledge base class object model 82. The object model 82 and knowledge database form the internal knowledge base module 54 (FIG. 2). The knowledge base class object model 82 defines the contents required to provide a functional subsystem. For example, a cooling system requires cooling passages of specific size, and appropriate placement relative to the mold cavity, along with valves to control the flow of coolant. The knowledge base class object model 82 defines the parts needed and the general operational function and requirements for each component. Information about the required parts is gathered as indicated at 78 from various databases and modules such as a standards database 80 and the knowledge databases 84, 82. The standards database 80 includes information from the company standards module 54, smart part module 52, and component catalogues module 58 illustrated in FIG. 2.

The requirements gathered at 78 produces a constraint collection 86. The constraint collection 86 defines requirements for each component part with respect to the requirements, best practices, component catalogues and application specific requirements. The constraint collection is the set of rules that each component part configuration must conform to and satisfy. The constraint collection 86 is an input to the process element 90 that "solves the problem". In other words, process element 90 applies the rules and constraints defined in the constraint collection 86 to provide specific part configurations for each component part. Bindings 88 is a data element output from the process element 90 containing configuration information for each component that satisfies the constraints developed in the constraint collection 86. A construct logical design process element 92 reviews the design with respect to the knowledge database 84 and the Master Control File 60. The information from the logical design element 92 stores information in the Master Control File 60.

The information from the logical design element 92 is stored as logical design data 100. Data stored within the logical design data element 100 updates the Master Control File 60. The Master Control File 60 is continually updated as component specification and configuration are defined, so that component configuration information for one component can be provided to build the constraint collection of another component. In other words, because each component is configured with respect to data contained with the Master Control File 60, every component is designed with respect to and in view of all other components of the tooling assembly.

The data on each component configuration contained within the Master Control File 60, along with application specific data is used with the design, and selection of each component within the tooling assembly or mold. Therefore, interrelationships between every component, with respect to every other component with the tooling assembly is continuously validated and maintained to provide a working tooling assembly at the end of the design process.

Further, the knowledge database 82 is used not only in the initial construction of the constraint collection but also during construction of the logical design 92, so that deviations from the constraint collection can be reviewed if necessary. In each tooling assembly, concessions may be required with regard to specific requirements or preferences. Deviation from input requirements may be required to provide a properly working tooling assembly. The process of this invention accommodates such modifications and alerts a designer of the deviations for approval or re-evaluation. This capability is unique in that it provides for deviation from the initial specifications when the initial specification, if followed literally, would not provide a usable or satisfactory design in view of functional and spatial relationships or best known practices. Therefore, the system validates each component part configuration, not only with regard to interrelationships with other parts through continually updating and comparison with the information contained within the Master Control File 60, and also best practices defined and contained within the knowledge database 84.

Design output of the tooling assembly or mold design stored within the Master Control File 60 can be formatted in any specified standard form, or alternately, for any standard CAD system. Information contained within the Master Control File 60 is interpreted as indicated at 94 to produce a graphical output 62. The graphical output 62 can be formatted for use with various known computer design and graphics programs to produce plotted engineering drawings, three-dimensional drawings, and specific component machining instructions. The system and process of this invention compiles information on each component part in the Master Control File 60. This information stored within the Master Control File 60, can be translated and reformatted by way of the build design interpreter or interface 94 to provide instructions and information in any desired format to facilitate building of the tooling assembly or mold.

Figure 4:
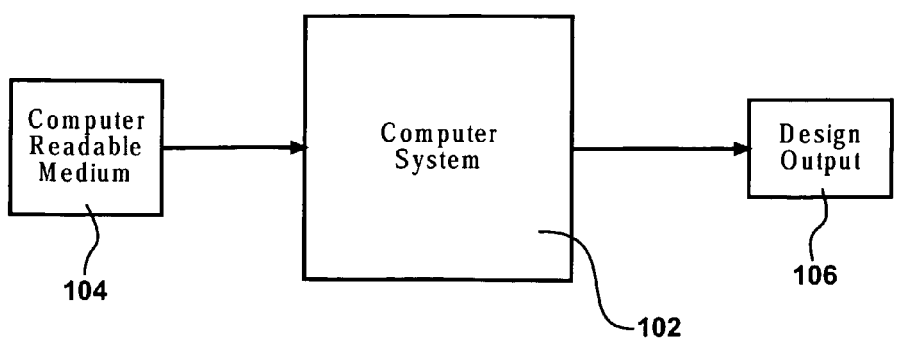
FIG. 4 is a schematic view of a computer system for designing a tooling assembly.

Referring to FIG. 4, the tooling assembly design process of this invention is encoded as a computer program operating on a computer system 102 (schematically shown). The computer program is stored on a computer readable medium 104 such as a magnetic storage device, compact disc, or as a program downloaded from a remote location. The encoded process operates the system 102 to design each component according to rules defined by the constraint collection 86. The computer system 102 executes the instructions stored on the computer readable medium to provide the desired design output 106. These defined rules and constraints are prioritized by a defined hierarchy.

One example of rule hierarchy can include a customer total mold weight requirement. The process and system will calculate the total mold weight and any component added to the mold during the design process will add to the total mold weight. The system calculates the weight of each hydraulic cylinder, external plate or alignment pin, and determines a total mold weight. The system will further estimate plate sizes along with calculating the resultant mold weight in the finished mold and selects component materials and sizes to meet the weight limitations. The calculation of mold weight is done instantaneous to inclusion of customer specific requirements and other requirements required for operation of a completed mold.

Many other rules come into play when determining the size of plates, pins and other mechanisms within the mold. Rules will exist suggesting certain amounts of steel to provide structural stability, to dissipate heat, and to provide adequate space for various components mounted within the mold. Further, the core and cavity of the mold must be sufficient to handle molding pressures and clamping forces. Often the rules for determining particular sizes are based on tables developed by engineers with general safety margins. Aligning these rules to produce good values is quite feasible in many cases. However, if the result of all these rules violates the maximum mold weight, the system will re-evaluate the mold design configuration. A designer can provide new inputs to deviate from the general rules. In some instances, a mold assembly can operate satisfactorily outside of current best practice configurations.

The extent of any deviation from a limitation will determine the magnitude of required changes to the mold design. For example, if the mold is just over the weight limitation, modifications in steel plates can be made to include specific weight reduction features such as creating angled corners. However, if the mold greatly exceeds the limit, other components of the mold such as the block or plate sizes are modified until the mold meets the specified limitations. Such changes necessitate changes in many of the various mechanisms mounted within the mold. The process and system of this invention provides a means of fulfilling these rules by deviating from specific parameters and account for effects on other mechanisms and components contained within the mold.

The process and system of this invention formulates rules for evaluation and considers how those rules interact with other rules. The process and system of this invention accounts for these interactions between tolerances, specifications, and best practices to provide a complete resolution and mold design accommodating each specific requirement.

The system develops advantageous trade-offs with respect to these rules according to a specific hierarchy developed by the system or specially determined according to customer requirements. This hierarchy may be adaptable to specific requirements of a customer or for component configurations. A hierarchy may assign primary importance to a mold weight restriction, with a secondary rule concerning parting line configuration. The process and system optimizes the design according to the hierarchy of restrictions without modifying or deviating from restrictions or requirements on mold weight and configuration of the mold parting line, making accommodating changes in other components within the mold.

The foregoing description is exemplary and not just a material specification. The invention has been described in an illustrative manner, and it should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A computer implemented method for designing a tooling assembly comprising the steps of:
   a.) determining a set of rules for each component of the tooling assembly including requirements obtained from several different specifications;
   b.) organizing each of the rules for each component according to a defined rule hierarchy such that the set of rules for each component include a more preferred rule and a less preferred rule;
   c.) determining a desired part geometry;
   d.) creating a configuration for each of a plurality of components for the tooling assembly that meet the determined set of rules for each component in accordance with the defined rule hierarchy and the desired part geometry;
   e.) maintaining relationships between each of the plurality of components in view of the defined rule hierarchy; and
   f) automatically verifying relationships between the plurality of components for the tooling assembly in view of the defined rule hierarchy and governing functional requirements.

2. The method of claim 1, wherein step f comprises automatically validating a spatial relationship between each of the plurality of components within the tooling assembly relative to every other of the plurality of components within the tooling assembly to ensure functionality of the tooling assembly.

3. The method of claim 1, comprising the step of overriding a component configuration automatically responsive to a conflict between a more preferred rule in accordance with the defined rule hierarchy and a less preferred rule so that the component configuration conforms to the more preferred rule according to the defined rule hierarchy.

4. The method of claim 1, comprising automatically compiling a list of the plurality of components having configurations that do not conform with the determined set of rules from one of the several different specifications.

5. The method of claim 1, comprising creating a Master Control File containing a description of each of the plurality of components required for a complete tooling assembly.

6. The method of claim 5, comprising modifying the Master Control File to alter the tooling assembly configuration.

7. The method of claim 5, comprising translating information contained within the Master Control File to produce a graphical output.

8. The method of claim 1, wherein said tooling assembly comprises a mold.

9. The method of claim 1, wherein said tooling assembly comprises a stamping die.

10. The method as recited in claim 1, wherein said step b of establishing a rule hierarchy includes assigning an importance to an overall tooling assembly characteristic.

11. The method as recited in claim 1, wherein each of the several different specifications provides only a portion of the rules needed to form a fully functioning tooling assembly.

12. The method as recited in claim 1, wherein said several different specifications of rules are provided in different formats.

13. The method as recited in claim 1, wherein said several different specifications include rules that contradict each other for at least one component part.

14. The method as recited in claim 1, wherein said determined set of rules includes a default set of rules providing requirements not obtained from the several different specifications.

15. A computer readable storage medium containing a plurality of computer executable instructions for automatically designing a tooling assembly, comprising:
  a first set of instructions directing the computer to determine a set of rules for each component of the tooling assembly obtained from several different specifications;
  a second set of instructions directing the computer to organize the set of rules based on a defined rule hierarchy for each of the rules for each component such that the set of rules includes a more preferred rule and a less preferred rule;
  a third set of instructions directing the computer to access a desired part geometry;
  a fourth set of instructions directing the computer to specify a configuration for each component that fulfills the determined set of rules in accordance with the defined rule hierarchy and the desired part geometry, wherein the forth set of instructions direct the computer to maintain relationships between each of the plurality of components in view of the defined rule hierarchy; and
  a fifth set of instructions directing the computer to automatically verify relationships between components in view of the defined rule hierarchy for each of the rule and governing functional relationship.

16. The storage medium of claim 15, wherein a sixth set of instructions comprises instructions directing the computer to validate spatial relationships between each component within the tooling assembly relative to every other component within the tooling assembly to ensure functionality of the tooling assembly.

17. The storage medium of claim 15, comprising instructions directing the computer to override a component configuration automatically responsive to a conflict between a more preferred rule and a less preferred rule so that the component configuration conforms to the more preferred rule.

18. The storage medium of claim 17, comprising instructions directing the computer to compile a list of components having configurations that do not conform with one of the rules.

19. The storage medium of claim 17, comprising instructions directing the computer to create a Master Control File containing a description of each rule required for a complete tooling assembly.

20. The storage medium of claim 19, comprising instructions directing the computer to modify information within the Master Control File to alter the tooling assembly configuration.

21. The storage medium of claim 17, comprising instructions directing the computer to translate information stored within the Master Control File to information used to produce a graphical output.

22. A computer system for automatically designing a tooling assembly, comprising:
  a database residing within a memory device of the computer system containing information obtained from several different modules relevant to the design of the tooling assembly;
  a Master Control File residing within the memory device of the computer containing a description of each component required for a tooling assembly design;
  a first set of instructions directing the computer to determine rules for each component in view of information contained within said database from the different modules;
  a second set of instructions directing the computer to assign an importance to each rule from the different modules such that the rules from different modules are assigned an importance relative to other rules from other modules;
  a third set of instructions directing the computer to determine a configuration of each component according to said rules and the importance assigned relative to other rules from other modules within the Master Control File, wherein the computer is directed to maintain relationships between each of the plurality of components in view of the assigned importance to each of the different rules;
  a fourth set of instructions directing the computer to override a component configuration automatically responsive to a conflict between a rule assigned a primary importance and a rule assigned a lesser importance; and
  a fifth set of instructions directing the computer to validate each component configuration in view of the importance assigned to each of the rules.

23. The system of claim 22, wherein said database comprises a standards database containing information containing customer specific preferences.

24. The system of claim 22, wherein said database comprises a knowledge database containing tooling assembly design parameters.

25. The system of claim 22, wherein said database comprises a component database containing configuration information for components used in designing the tooling assembly.

26. The system of claim 22, comprising an interface for converting information stored within said Master Control File into instructions executed by a graphical output device.

* * * * *

UNITED STATES PATENT AND TRADEMARK OFFICE
CERTIFICATE OF CORRECTION

PATENT NO. : 7,117,055 B2 Page 1 of 1
APPLICATION NO. : 10/461039
DATED : October 3, 2006
INVENTOR(S) : Mateau et al.

It is certified that error appears in the above-identified patent and that said Letters Patent is hereby corrected as shown below:

Column 13, line 27: The second occurrence of "rule" should be --rules--

Signed and Sealed this

Nineteenth Day of December, 2006

JON W. DUDAS
*Director of the United States Patent and Trademark Office*